US012803713B2

(12) United States Patent
Kim et al.

(10) Patent No.: US 12,803,713 B2
(45) Date of Patent: Nov. 17, 2026

(54) METHOD AND APPARATUS FOR COVERAGE ENHANCEMENT IN COMMUNICATION SYSTEM

(71) Applicant: ELECTRONICS AND TELECOMMUNICATIONS RESEARCH INSTITUTE, Daejeon (KR)

(72) Inventors: Jung Bin Kim, Daejeon (KR); Gyeong Rae Im, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 374 days.

(21) Appl. No.: 18/507,029

(22) Filed: Nov. 11, 2023

(65) Prior Publication Data

US 2024/0163021 A1 May 16, 2024

(30) Foreign Application Priority Data

Nov. 11, 2022 (KR) ........................ 10-2022-0150101
Nov. 3, 2023 (KR) ........................ 10-2023-0151221

(51) Int. Cl.

| | |
|---|---|
| ***H04W 74/00*** | (2009.01) |
| ***H04L 1/00*** | (2006.01) |
| ***H04L 1/1812*** | (2023.01) |
| *H04W 74/0833* | (2024.01) |

(52) U.S. Cl.

CPC .......... *H04L 1/1812* (2013.01); *H04L 1/0003* (2013.01); *H04W 74/006* (2013.01); *H04W 74/0833* (2013.01)

(58) Field of Classification Search

CPC ... H04L 1/0003; H04L 1/1812; H04L 1/1825; H04L 1/1864; H04L 1/1896; H04W 74/006; H04W 74/0833
USPC .......................................................... 370/329
See application file for complete search history.

(56) References Cited

U.S. PATENT DOCUMENTS

| | | | |
|---|---|---|---|
| 2021/0120581 | A1 | 4/2021 | Kim |
| 2021/0352735 | A1 | 11/2021 | Bae et al. |
| 2021/0392679 | A1 | 12/2021 | Kim et al. |
| 2022/0124833 | A1 | 4/2022 | Taherzadeh Boroujeni et al. |
| 2022/0279589 | A1 | 9/2022 | Taherzadeh Boroujeni et al. |
| 2022/0295567 | A1 | 9/2022 | Wei et al. |
| 2022/0345271 | A1 | 10/2022 | Wu et al. |
| 2022/0346150 | A1 | 10/2022 | Sridharan et al. |
| 2024/0114516 | A1 * | 4/2024 | Ma ........................ H04L 1/1812 |

(Continued)

OTHER PUBLICATIONS

Thales, "Revised WID: NR NTN (Non-Terrestrial Networks) enhancements", 3GPP TSG RAN Meeting #97-e, RP-222654, e-meeting, Sep. 12-16, 2022.

*Primary Examiner* — Robert J Lopata
(74) *Attorney, Agent, or Firm* — LRK PATENT LAW FIRM

(57) ABSTRACT

A method of a terminal may include: receiving, from a base station, repeated transmission configuration information of repeated transmission for a message 4 (Msg4) hybrid automatic repeat request-acknowledgement (HARQ-ACK); receiving a Msg4 from the base station in a random access (RA) procedure between the terminal and the base station; and performing repeated transmission for the Msg4 HARQ-ACK based on the repeated transmission configuration information.

16 Claims, 5 Drawing Sheets

(56) References Cited

U.S. PATENT DOCUMENTS

| | | | | |
|---|---|---|---|---|
| 2024/0114522 | A1* | 4/2024 | Cozzo | H04L 1/1854 |
| 2024/0155608 | A1* | 5/2024 | Park | H04L 1/1812 |
| 2024/0380524 | A1* | 11/2024 | Marcone | H04W 74/0833 |
| 2025/0030507 | A1* | 1/2025 | Prasad | H04B 17/328 |
| 2025/0038892 | A1* | 1/2025 | Cui | H04L 5/0055 |
| 2025/0365732 | A1* | 11/2025 | Ye | H04L 1/189 |

* cited by examiner

200

METHOD AND APPARATUS FOR COVERAGE ENHANCEMENT IN COMMUNICATION SYSTEM

CROSS-REFERENCE TO RELATED APPLICATIONS

This application claims priority to Korean Patent Applications No. 10-2022-0150101, filed on Nov. 11, 2022, and No. 10-2023-0151221, filed on Nov. 3, 2023, with the Korean Intellectual Property Office (KIPO), the entire contents of which are hereby incorporated by reference.

BACKGROUND

1. Technical Field

Exemplary embodiments of the present disclosure relate to a communication coverage enhancement technique, and more specifically, to a technique for enhancing a communication coverage based on repeated transmission.

2. Description of Related Art

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

A communication network (e.g., NR network) may be classified into a terrestrial network and a non-terrestrial network. The non-terrestrial network may be referred to as an NTN. In a terrestrial network, communication services for a terminal may be provided by a base station located on the ground. In a non-terrestrial network, communication services for a terminal may be provided by a communication node (e.g., satellite, base station, unmanned aerial vehicle (UAV), drone, or the like) located in a non-terrestrial location. Communication in the terrestrial network and the non-terrestrial network may be performed based on the NR communication technology.

In a terrestrial network or non-terrestrial network with a large cell radius, a distance between a terminal and a base station may be long. In this case, a power loss may increase in communication between the terminal and the base station. In the above-described environment, a received power level of an uplink signal/channel of the terminal, which is received at the base station, may be low, and in this case, the base station may fail to decode the uplink signal/channel of the terminal. In the above-described environment, a received power level of a downlink signal/channel of the base station, which is received at the terminal, may be low, and in this case, the terminal may fail to decode the downlink signal/channel of the base station. To solve the above-described problem, methods for communication coverage enhancement may be required. For example, methods of repeated transmission of uplink signals/channels and/or methods of repeated transmission of downlink signals/channels may be required.

SUMMARY

Exemplary embodiments of the present disclosure are directed to providing a method and an apparatus for coverage enhancement in a communication network.

According to a first exemplary embodiment of the present disclosure, a method of a terminal may comprise: receiving, from a base station, repeated transmission configuration information of repeated transmission for a message 4 (Msg4) hybrid automatic repeat request-acknowledgement (HARQ-ACK); transmitting a repeated transmission capability or a request of repeated transmission to the base station; receiving a Msg4 from the base station in a random access (RA) procedure between the terminal and the base station; and performing repeated transmission for the Msg4 HARQ-ACK based on the repeated transmission configuration information.

The repeated transmission configuration information may include at least one of: an information element indicating enabling or disabling of repeated transmission, an information element indicating a target signal of repeated transmission, an information element indicating a target channel of repeated transmission, an information element indicating a set of supportable repeated transmission numbers, an information element indicating a repeated transmission number, an information element indicating a periodicity of repeated transmission, an information element indicating a quality threshold used to determine whether to perform repeated transmission, an information element indicating a transmission resource of a message requesting repeated transmission, an information element indicating enabling or disabling a transmission operation of the message requesting repeated transmission, an information element indicating a transmission resource of a message indicating that repeated transmission can be performed, or an information element indicating enabling or disabling a transmission operation of the message indicating that repeated transmission can be performed.

The repeated transmission configuration information may be received through at least one of a system information block (SIB) or downlink control information (DCI), and the DCI may be a scheduling DCI for the Msg4.

The receiving of the repeated transmission configuration information may comprise: receiving, from the base station, a SIB including an information element indicating a set of supportable repeated transmission numbers; and receiving, from the base station, a DCI including an information element indicating one repeated transmission number among the supportable repeated transmission numbers.

The information element indicating the one repeated transmission number may be expressed by a modulation and coding scheme (MCS) field, a HARQ process number (HPN) field, or a downlink assignment index (DAI) field included in the DCI.

The method may further comprise: measuring a reception quality for a downlink signal/channel received from the base station; and comparing the reception quality with a quality threshold, wherein when the reception quality is below the quality threshold, the repeated transmission for the Msg4 HARQ-ACK is performed.

The quality threshold used to determine whether to perform the repeated transmission for the Msg4 HARQ-ACK may be distinct from a quality threshold used to determine whether to perform repeated transmission for a message 3 (Msg3).

The method may further comprise: measuring a reception quality for a downlink signal/channel received from the base station; comparing the reception quality with a quality threshold; and in response to that the reception quality is below the quality threshold, transmitting, to the base station, a message including information requesting the repeated transmission of the Msg4 HARQ-ACK or information indicating that the repeated transmission of the Msg4 HARQ-ACK is possible, wherein the repeated transmission for the Msg4 HARQ-ACK is performed after transmission of the message.

According to a second exemplary embodiment of the present disclosure, a method of a base station may comprise: transmitting, to a terminal, repeated transmission configuration information of repeated transmission of a message 4 (Msg4) hybrid automatic repeat request-acknowledgement (HARQ-ACK); transmitting a Msg4 to the terminal in a random access (RA) procedure between the base station and the terminal; and performing a reception operation for the Msg4 HARQ-ACK based on the repeated transmission configuration information.

The repeated transmission configuration information may include at least one of: an information element indicating enabling or disabling of repeated transmission, an information element indicating a target signal of repeated transmission, an information element indicating a target channel of repeated transmission, an information element indicating a set of supportable repeated transmission numbers, an information element indicating a repeated transmission number, an information element indicating a periodicity of repeated transmission, an information element indicating a quality threshold used to determine whether to perform repeated transmission, an information element indicating a transmission resource of a message requesting repeated transmission, an information element indicating enabling or disabling a transmission operation of the message requesting repeated transmission, an information element indicating a transmission resource of a message indicating that repeated transmission can be performed, or an information element indicating enabling or disabling a transmission operation of the message indicating that repeated transmission can be performed.

The repeated transmission configuration information may be transmitted through at least one of a system information block (SIB) or downlink control information (DCI), and the DCI is a scheduling DCI for the Msg4.

The transmitting of the repeated transmission configuration information may comprise: transmitting, to the terminal, a SIB including an information element indicating a set of supportable repeated transmission numbers; and transmitting, to the terminal, a DCI including an information element indicating one repeated transmission number among the supportable repeated transmission numbers.

The information element indicating the one repeated transmission number may be expressed by a modulation and coding scheme (MCS) field, a HARQ process number (HPN) field, or a downlink assignment index (DAI) field included in the DCI.

According to a third exemplary embodiment of the present disclosure, a terminal may comprise at least one processor, and the at least one processor may cause the terminal to perform: receiving, from a base station, repeated transmission configuration information of repeated transmission for a message 4 (Msg4) hybrid automatic repeat request-acknowledgement (HARQ-ACK); transmitting a repeated transmission capability or a request of repeated transmission to the base station; receiving a Msg4 from the base station in a random access (RA) procedure between the terminal and the base station; and performing repeated transmission for the Msg4 HARQ-ACK based on the repeated transmission configuration information.

The repeated transmission configuration information may include at least one of: an information element indicating enabling or disabling of repeated transmission, an information element indicating a target signal of repeated transmission, an information element indicating a target channel of repeated transmission, an information element indicating a set of supportable repeated transmission numbers, an information element indicating a repeated transmission number, an information element indicating a periodicity of repeated transmission, an information element indicating a quality threshold used to determine whether to perform repeated transmission, an information element indicating a transmission resource of a message requesting repeated transmission, an information element indicating enabling or disabling a transmission operation of the message requesting repeated transmission, an information element indicating a transmission resource of a message indicating that repeated transmission can be performed, or an information element indicating enabling or disabling a transmission operation of the message indicating that repeated transmission can be performed.

The repeated transmission configuration information may be received through at least one of a system information block (SIB) or downlink control information (DCI), and the DCI is a scheduling DCI for the Msg4.

In the receiving of the repeated transmission configuration information, the at least one processor may further cause the terminal to perform: receiving, from the base station, a SIB including an information element indicating a set of supportable repeated transmission numbers; and receiving, from the base station, a DCI including an information element indicating one repeated transmission number among the supportable repeated transmission numbers.

The information element indicating the one repeated transmission number may be expressed by a modulation and coding scheme (MCS) field, a HARQ process number (HPN) field, or a downlink assignment index (DAI) field included in the DCI.

The at least one processor may further cause the terminal to perform: measuring a reception quality for a downlink signal/channel received from the base station; and comparing the reception quality with a quality threshold, wherein when the reception quality is below the quality threshold, the repeated transmission for the Msg4 HARQ-ACK is performed.

The at least one processor may further cause the terminal to perform: measuring a reception quality for a downlink signal/channel received from the base station; comparing the reception quality with a quality threshold; and in response to that the reception quality is below the quality threshold, transmitting, to the base station, a message including information requesting the repeated transmission of the Msg4 HARQ-ACK or information indicating that the repeated transmission of the Msg4 HARQ-ACK is possible, wherein the repeated transmission for the Msg4 HARQ-ACK is performed after transmission of the message.

According to the present disclosure, the base station may transmit configuration information for repeated transmission of an uplink signal/channel (e.g., Msg4 HARQ-ACK or MsgB HARQ-ACK) to the terminal. The terminal can repeatedly transmit the uplink signal/channel based on the configuration information received from the base station. According to the above-described method, a transmission coverage of the uplink signal/channel can be increased, and a probability of successful decoding of the uplink signal/channel at the base station can be increased. Accordingly, the performance of the communication network can be improved.

DETAILED DESCRIPTION OF THE EMBODIMENTS

Figure 1:
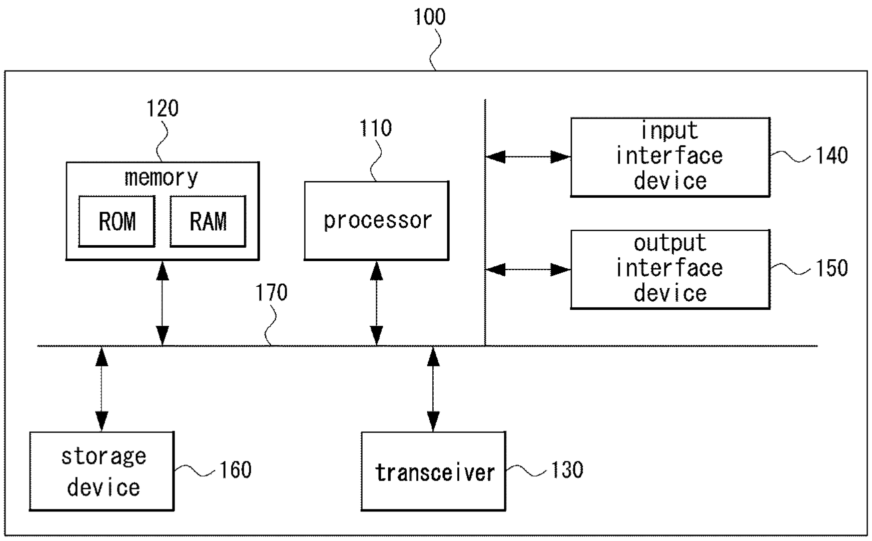
FIG. 1 is a block diagram illustrating a first exemplary embodiment of a communication node in a communication network.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication network may include a terrestrial network and a non-terrestrial network. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

In exemplary embodiments, "an operation (e.g., transmission operation) is configured" may mean that "configuration information (e.g., information element(s) or parameter(s)) for the operation and/or information indicating to perform the operation is signaled". "Information element(s) (e.g., parameter(s)) are configured" may mean that "corresponding information element(s) are signaled". In other words, "an operation (e.g., transmission operation) is configured in a communication node" may mean that the communication node receives "configuration information (e.g., information elements, parameters) for the operation" and/or "information indicating to perform the operation". "An information element (e.g. parameter) is configured in a communication node" may mean that "the information element is signaled to the communication node (e.g. the communication node receives the information element)".

The signaling may be at least one of system information (SI) signaling (e.g., transmission of system information block (SIB) and/or master information block (MIB)), RRC signaling (e.g., transmission of RRC parameters and/or higher layer parameters), MAC control element (CE) signaling, or PHY signaling (e.g., transmission of downlink control information (DCI), uplink control information (UCI), and/or sidelink control information (SCI)). A signaling message may be at least one of an SI signaling message (e.g., SI message), an RRC signaling message (e.g., RRC message), a MAC CE signaling message (e.g., MAC CE message or MAC message), or a PHY signaling message (e.g., PHY message).

Hereinafter, even when a method (e.g., transmission or reception of a signal) performed at a first communication node among communication nodes is described, a corresponding second communication node may perform a method (e.g., reception or transmission of the signal) corresponding to the method performed at the first communication node. That is, when an operation of a terminal is described, a base station corresponding to the terminal may perform an operation corresponding to the operation of the terminal. Conversely, when an operation of a base station is described, a terminal corresponding to the base station may perform an operation corresponding to the operation of the base station. In addition, when an operation of a first terminal is described, a second terminal corresponding to the first terminal may perform an operation corresponding to the operation of the first terminal. Conversely, when an operation of a second terminal is described, a first terminal corresponding to the second terminal may perform an operation corresponding to the operation of the second terminal.

FIG. 1 is a block diagram illustrating a first exemplary embodiment of a communication node in a communication network.

Referring to FIG. 1, a communication node 100 may comprise at least one processor 110, a memory 120, and a transceiver 130 connected to the network for performing communications. Also, the communication node 100 may further comprise an input interface device 140, an output interface device 150, a storage device 160, and the like. Each component included in the communication node 100 may communicate with each other as connected through a bus 170.

However, each component included in the communication node 100 may not be connected to the common bus 170 but may be connected to the processor 110 via an individual interface or a separate bus. For example, the processor 110 may be connected to at least one of the memory 120, the transceiver 130, the input interface device 140, the output interface device 150 and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

Figure 2:
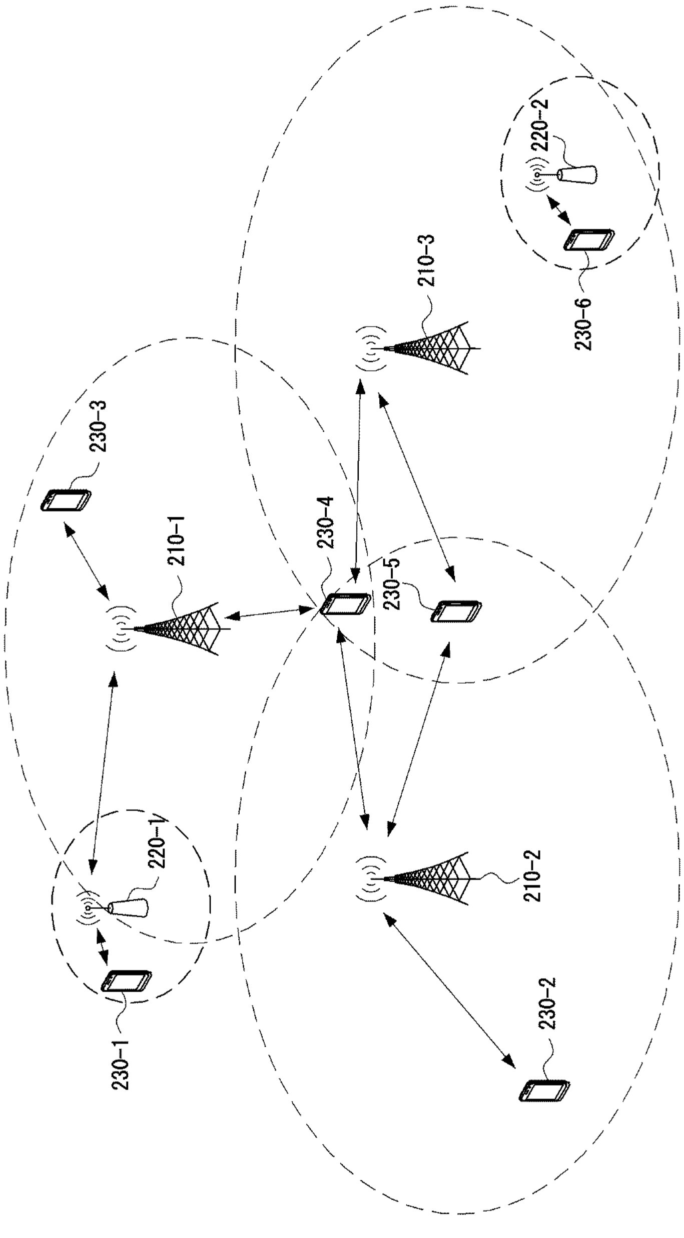
FIG. 2 is a conceptual diagram illustrating a first exemplary embodiment of a communication network.

FIG. 2 is a conceptual diagram illustrating a first exemplary embodiment of a communication network.

Referring to FIG. 2, a communication network 200 may be a terrestrial network. The communication system 200 may comprise a plurality of communication nodes 210-1, 210-2, 210-3, 220-1, 220-2, 230-1, 230-2, 230-3, 230-4, 230-5, and 230-6. In addition, the communication system 200 may further comprise a core network (e.g., a serving gateway (S-GW), a packet data network (PDN) gateway (P-GW), and a mobility management entity (MME)). When the communication system 200 is a 5G communication system (e.g., new radio (NR) system), the core network may include an access and mobility management function (AMF), a user plane function (UPF), a session management function (SMF), and the like.

The plurality of communication nodes 210 to 230 may support a communication protocol defined by the 3rd generation partnership project (3GPP) specifications (e.g., LTE communication protocol, LTE-A communication protocol, NR communication protocol, or the like). The plurality of communication nodes 210 to 230 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

The communication system 200 may comprise a plurality of base stations 210-1, 210-2, 210-3, 220-1, and 220-2, and a plurality of terminals 230-1, 230-2, 230-3, 230-4, 230-5, and 230-6. Each of the first base station 210-1, the second base station 210-2, and the third base station 210-3 may form a macro cell, and each of the fourth base station 220-1 and the fifth base station 220-2 may form a small cell. The fourth base station 220-1, the third terminal 230-3, and the fourth terminal 230-4 may belong to cell coverage of the first base station 210-1. Also, the second terminal 230-2, the fourth terminal 230-4, and the fifth terminal 230-5 may belong to cell coverage of the second base station 210-2. Also, the fifth base station 220-2, the fourth terminal 230-4, the fifth terminal 230-5, and the sixth terminal 230-6 may belong to cell coverage of the third base station 210-3. Also, the first terminal 230-1 may belong to cell coverage of the fourth base station 220-1, and the sixth terminal 230-6 may belong to cell coverage of the fifth base station 220-2.

Here, each of the plurality of base stations 210-1, 210-2, 210-3, 220-1, and 220-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 230-1, 230-2, 230-3, 230-4, 230-5, and 230-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Each of the plurality of base stations 210-1, 210-2, 210-3, 220-1, and 220-2 may operate in the same frequency band or in different frequency bands. The plurality of base stations 210-1, 210-2, 210-3, 220-1, and 220-2 may be connected to each other via an ideal backhaul or a non-ideal backhaul, and exchange information with each other via the ideal or non-ideal backhaul. Also, each of the plurality of base stations 210-1, 210-2, 210-3, 220-1, and 220-2 may be connected to the core network through the ideal or non-ideal backhaul. Each of the plurality of base stations 210-1, 210-2, 210-3, 220-1, and 220-2 may transmit a signal received from the core network to the corresponding terminal 230-1, 230-2, 230-3, 230-4, 230-5, or 230-6, and transmit a signal received from the corresponding terminal 230-1, 230-2, 230-3, 230-4, 230-5, or 230-6 to the core network.

In addition, each of the plurality of base stations 210-1, 210-2, 210-3, 220-1, and 220-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 230-1, 230-2, 230-3, 230-4, 230-5, and 230-6 may perform operations corresponding to the operations of the plurality of base stations 210-1, 210-2, 210-3, 220-1, and 220-2 (i.e., the operations supported by the plurality of base stations 210-1, 210-2, 210-3, 220-1, and 220-2). For example, the second base station 210-2 may transmit a signal to the fourth terminal 230-4 in the SU-MIMO manner, and the fourth terminal 230-4 may receive the signal from the second base station 210-2 in the SU-MIMO manner. Alternatively, the second base station 210-2 may transmit a signal to the fourth terminal 230-4 and fifth terminal 230-5 in the MU-MIMO manner, and the fourth terminal 230-4 and fifth terminal 230-5 may receive the signal from the second base station 210-2 in the MU-MIMO manner.

The first base station 210-1, the second base station 210-2, and the third base station 210-3 may transmit a signal to the fourth terminal 230-4 in the CoMP transmission manner, and the fourth terminal 230-4 may receive the signal from the first base station 210-1, the second base station 210-2, and the third base station 210-3 in the CoMP manner. Also, each of the plurality of base stations 210-1, 210-2, 210-3, 220-1, and 220-2 may exchange signals with the corresponding terminals 230-1, 230-2, 230-3, 230-4, 230-5, or 230-6 which belongs to its cell coverage in the CA manner. Each of the base stations 210-1, 210-2, and 210-3 may control D2D communications between the fourth terminal 230-4 and the fifth terminal 230-5, and thus the fourth terminal 230-4 and the fifth terminal 230-5 may perform the D2D communications under control of the second base station 210-2 and the third base station 210-3.

Figure 3:
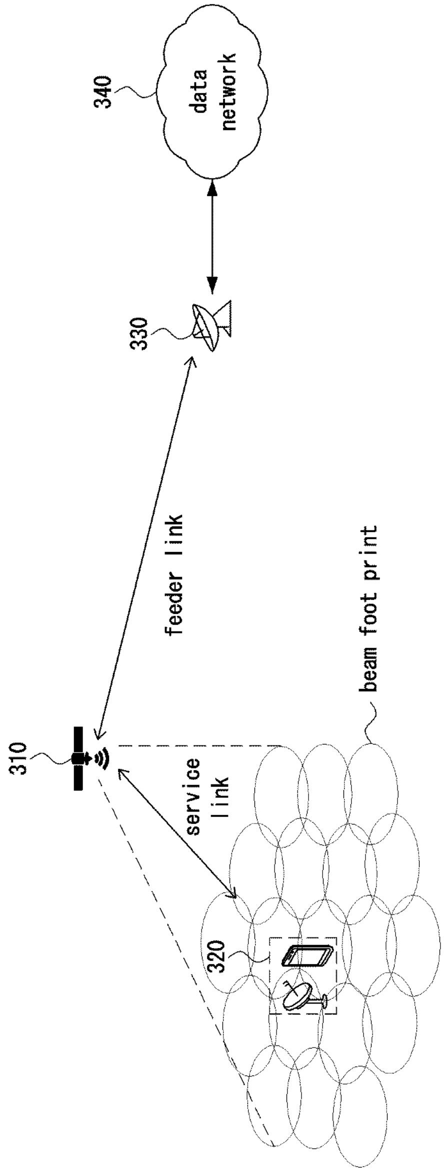
FIG. 3 is a conceptual diagram illustrating a second exemplary embodiment of a communication network.

FIG. 3 is a conceptual diagram illustrating a second exemplary embodiment of a communication network.

Referring to FIG. 3, a communication network may be a non-terrestrial network (NTN). The NTN may include a satellite 310, a communication node 320, a gateway 330, a data network 340, and the like. The NTN shown in FIG. 3 may be an NTN based on a transparent payload. The satellite 310 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 320 may include a communication node (e.g., a user equipment (UE) or a terminal) located on a terrestrial site and a communication node (e.g., an airplane, a drone) located on a non-terrestrial space. A service link may be established between the satellite 310 and the communication node 320, and the service link may be a radio link. The satellite 310 may provide communication services to the communication node 320 using one or more beams. The shape of a footprint of the beam of the satellite 310 may be elliptical.

The communication node 320 may perform communications (e.g., downlink communication and uplink communication) with the satellite 310 using LTE technology and/or NR technology. The communications between the satellite 310 and the communication node 320 may be performed using an NR-Uu interface. When dual connectivity (DC) is supported, the communication node 320 may be connected to other base stations (e.g., base stations supporting LTE and/or NR functionality) as well as the satellite 310, and perform DC operations based on the techniques defined in the LTE and/or NR specifications.

The gateway 330 may be located on a terrestrial site, and a feeder link may be established between the satellite 310 and the gateway 330. The feeder link may be a radio link. The gateway 330 may be referred to as a 'non-terrestrial network (NTN) gateway'. The communications between the satellite 310 and the gateway 330 may be performed based on an NR-Uu interface or a satellite radio interface (SRI). The gateway 330 may be connected to the data network 340. There may be a 'core network' between the gateway 330 and the data network 340. In this case, the gateway 330 may be connected to the core network, and the core network may be connected to the data network 340. The core network may support the NR technology. For example, the core network may include an access and mobility management function (AMF), a user plane function (UPF), a session management function (SMF), and the like. The communications between the gateway 330 and the core network may be performed based on an NG-C/U interface.

Alternatively, a base station and the core network may exist between the gateway 330 and the data network 340. In this case, the gateway 330 may be connected with the base station, the base station may be connected with the core network, and the core network may be connected with the data network 340. The base station and core network may support the NR technology. The communications between the gateway 330 and the base station may be performed based on an NR-Uu interface, and the communications between the base station and the core network (e.g., AMF, UPF, SMF, and the like) may be performed based on an NG-C/U interface.

Figure 4:
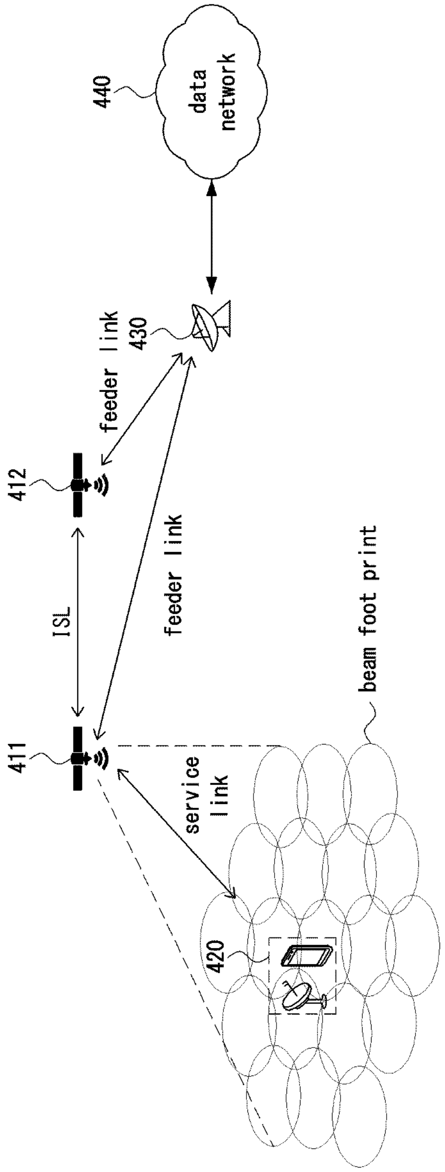
FIG. 4 is a conceptual diagram illustrating a third exemplary embodiment of a communication network.

FIG. 4 is a conceptual diagram illustrating a third exemplary embodiment of a communication network.

Referring to FIG. 4, a communication network may be an NTN. The NTN may include a first satellite 411, a second satellite 412, a communication node 420, a gateway 430, a data network 440, and the like. The NTN shown in FIG. 4 may be a regenerative payload based NTN. For example, each of the satellites 411 and 412 may perform a regenerative operation (e.g., demodulation, decoding, re-encoding, re-modulation, and/or filtering operation) on a payload received from other entities (e.g., the communication node 420 or the gateway 430), and transmit the regenerated payload Each of the satellites 411 and 412 may be a LEO satellite, a MEO satellite, a GEO satellite, a HEO satellite, or a UAS platform. The UAS platform may include a HAPS. The satellite 411 may be connected to the satellite 412, and an inter-satellite link (ISL) may be established between the satellite 411 and the satellite 412. The ISL may operate in an RF frequency band or an optical band. The ISL may be established optionally. The communication node 420 may include a terrestrial communication node (e.g., UE or terminal) and a non-terrestrial communication node (e.g., airplane or drone). A service link (e.g., radio link) may be established between the satellite 411 and communication node 420. The satellite 411 may provide communication services to the communication node 420 using one or more beams.

The communication node 420 may perform communications (e.g., downlink communication or uplink communication) with the satellite 411 using LTE technology and/or NR technology. The communications between the satellite 411 and the communication node 420 may be performed using an NR-Uu interface. When DC is supported, the communication node 420 may be connected to other base stations (e.g., base stations supporting LTE and/or NR functionality) as well as the satellite 411, and may perform DC operations based on the techniques defined in the LTE and/or NR specifications.

The gateway 430 may be located on a terrestrial site, a feeder link may be established between the satellite 411 and the gateway 430, and a feeder link may be established between the satellite 412 and the gateway 430. The feeder link may be a radio link. When the ISL is not established between the satellite 411 and the satellite 412, the feeder link between the satellite 411 and the gateway 430 may be established mandatorily.

The communications between each of the satellites 411 and 412 and the gateway 430 may be performed based on an NR-Uu interface or an SRI. The gateway 430 may be connected to the data network 440. There may be a core network between the gateway 430 and the data network 440. In this case, the gateway 430 may be connected to the core network, and the core network may be connected to the data network 440. The core network may support the NR technology. For example, the core network may include AMF, UPF, SMF, and the like. The communications between the gateway 430 and the core network may be performed based on an NG-C/U interface.

Alternatively, a base station and the core network may exist between the gateway 430 and the data network 440. In this case, the gateway 430 may be connected with the base station, the base station may be connected with the core network, and the core network may be connected with the data network 440. The base station and the core network may support the NR technology. The communications between the gateway 430 and the base station may be performed based on an NR-Uu interface, and the communications between the base station and the core network (e.g., AMF, UPF, SMF, and the like) may be performed based on an NG-C/U interface.

NTN reference scenarios may be defined as shown in Table 1 below.

TABLE 1

| | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 310 in the NTN shown in FIG. 3 is a GEO satellite (e.g., a GEO satellite that supports a transparent function), this may be referred to as 'scenario A'. When the satellites 411 and 412 in the NTN shown in FIG. 4 are GEO satellites (e.g., GEOs that support a regenerative function), this may be referred to as 'scenario B'.

When the satellite 310 in the NTN shown in FIG. 3 is an LEO satellite with steerable beams, this may be referred to as 'scenario C1'. When the satellite 310 in the NTN shown in FIG. 3 is an LEO satellite having beams moving with the satellite, this may be referred to as 'scenario C2'. When the satellites 411 and 412 in the NTN shown in FIG. 4 are LEO satellites with steerable beams, this may be referred to as 'scenario D1'. When the satellites 411 and 412 in the NTN shown in FIG. 4 are LEO satellites having beams moving with the satellites, this may be referred to as 'scenario D2'.

Parameters for the scenarios defined in Table 1 may be defined as shown in Table 2 below.

TABLE 2

| | Scenarios A and B | Scenarios C and D |
|---|---|---|
| Altitude | 35,786 km | 600 km<br>1,200 km |
| Spectrum (service link) | <6 GHz (e.g., 2 GHz)<br>>6 GHz (e.g., DL 20 GHz, UL 30 GHZ) | |
| Maximum channel bandwidth capability (service link) | 30 MHz for band <6 GHz<br>1 GHz for band >6 GHz | |
| Maximum distance between satellite and communication node (e.g., UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links)<br>−5.77 ms (altitude of 600 km)<br>−41.77 ms (altitude of 1,200 km)<br>Scenario D: (regenerative payload: only service link)<br>−12.89 ms (altitude of 600 km)<br>−20.89 ms (altitude of 1,200 km) |
| Maximum delay variation within a single beam | 16 ms | 4.44 ms (altitude of 600 km)<br>6.44 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

| | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Meanwhile, a terminal may perform an initial access procedure with a base station. The initial access procedure may be classified into a 4-step random access (RA) procedure and a 2-step RA procedure. In the 4-step RA procedure, the terminal may receive a message 4 (Msg4) from the base station, and transmit a hybrid automatic repeat request-acknowledgement (HARQ-ACK) for the Msg4 to the base station on a physical uplink control channel (PUCCH) (or physical uplink shared channel (PUSCH)). The HARQ-ACK for the Msg4 may be referred to as a Msg4 HARQ-ACK. In the 2-step RA procedure, the terminal may receive a message B (MsgB) from the base station, and transmit a HARQ-ACK for the MsgB to the base station on a PUCCH (or PUSCH). The HARQ-ACK for the MsgB may be referred to as a MsgB HARQ-ACK.

In a terrestrial network or non-terrestrial network with a large cell radius, a distance between the terminal and the base station may be long. In this case, a power loss may increase in communication between the terminal and the base station. In the above-described environment, a received power level of a Msg4 HARQ-ACK or MsgB HARQ-ACK of the terminal, which is received at the base station, may be low, and in this case, the base station may fail to decode the Msg4 HARQ-ACK or MsgB HARQ-ACK of the terminal. To solve the above-described problem, the terminal may repeatedly transmit the Msg4 HARQ-ACK or MsgB HARQ-ACK. In the present disclosure, methods for repeated transmission of a Msg4 HARQ-ACK or MsgB HARQ-ACK will be described. Exemplary embodiments of the present disclosure may be applied to repeated transmission of a Msg4 HARQ-ACK or MsgB HARQ-ACK as well as repeated transmission of a downlink signal/channel, uplink signal/channel, and/or sidelink signal/channel. The downlink signal/channel may refer to a downlink signal and/or a downlink channel. The uplink signal/channel may refer to an uplink signal and/or an uplink channel. The sidelink signal/channel may refer to a sidelink signal and/or a sidelink channel. The repeated transmission of an uplink signal/channel may be performed as follows.

Figure 5:
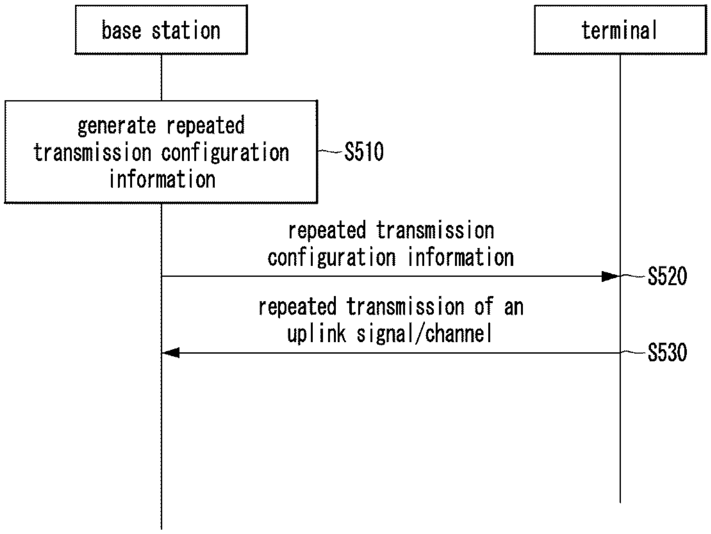
FIG. 5 is a sequence chart illustrating a first exemplary embodiment of a method for repeated transmission of an uplink signal/channel.

FIG. 5 is a sequence chart illustrating a first exemplary embodiment of a method for repeated transmission of an uplink signal/channel.

Referring to FIG. 5, the base station may generate repeated transmission configuration information (S510). The repeated transmission configuration information may be referred to as repetition configuration information or a repetition factor. The repeated transmission configuration information may include at least one of an information element indicating enabling or disabling of repeated transmission, an information element indicating a target signal and/or target channel of repeated transmission, an information element (e.g., combination, list, or configuration) indicating a set of supportable repeated transmission numbers, an information element indicating a repeated transmission number, or an information element indicating a periodicity of repeated transmission. The information element may refer to a parameter. The target signal and/or target channel for repeated transmission may be a Msg4 HARQ-ACK, MsgB HARQ-ACK, or the like. The set of supportable repeat transmission numbers may be configured as {1,2}, {2,4}, {4,8}, {1,2,3,4}, {1,2,4,8}, {2,4,6,8}, or {2,4,8,16}. In other words, the set of supportable repeat transmission numbers may include one or more repeated transmission numbers.

The base station may transmit the repeated transmission configuration information to the terminal through signaling (S520). The signaling may be at least one of system information (SI) signaling, radio resource control (RRC) signaling, medium access control (MAC) control element (CE) signaling, or physical layer (PHY) signaling. The repeated transmission configuration information may be transmitted using one signaling message or multiple signaling messages. For example, some information elements included in the repeated transmission configuration information may be configured in the terminal through SI signaling, and the remaining information elements included in the repeated transmission configuration information may be configured in the terminal through MAC CE signaling and/or PHY signaling. For example, the repeated transmission configuration information may be indicated by a combination of SI signaling and PHY signaling.

The terminal may receive the repeated transmission configuration information from the base station, and identify the information element(s) included in the repeated transmission configuration information. The terminal may perform repeated transmission for an uplink signal/channel based on the repeated transmission configuration information (S530). For example, the terminal may perform repeated transmission for a Msg4 HARQ-ACK or MsgB HARQ-ACK. The base station may perform a reception operation for the uplink signal/channel of the terminal based on the repeated transmission configuration information. For example, the base station may receive the Msg4 HARQ-ACK or MsgB HARQ-ACK from the terminal based on the repeated transmission configuration information.

Alternatively, after the step S520, the terminal may determine whether to perform repeated transmission. For example, the terminal may measure a reception quality (e.g., reference signal received power (RSRP)) of a downlink signal/channel (e.g., SSB, reference signal, Msg2, MsgB, Msg4) received from the base station, and compare the measured reception quality with a quality threshold (e.g., RSRP threshold). The quality threshold may be included in the repeated transmission configuration information. When the measured reception quality is greater than or equal to the quality threshold, the terminal may determine that repeated transmission is not required. In this case, even when the repeated transmission configuration information is received from the base station, the terminal may not perform repeated transmission for a Msg4 HARQ-ACK or MsgB HARQ-ACK. The quality threshold used to determine whether to perform repeated transmission for a Msg4 HARQ-ACK or MsgB HARQ-ACK is distinct from a quality threshold (e.g., RSRP threshold) used to determine whether to perform repeated transmission for a Msg3.

When the measured reception quality is less than the quality threshold, the terminal may determine that repeated transmission is required. In this case, the terminal may perform repeated transmission for a Msg4 HARQ-ACK or MsgB HARQ-ACK based on the repeated transmission configuration information received from the base station. Alternatively, if it is determined that repeated transmission is required, the terminal may transmit to the base station a message requesting repeated transmission or a message indicating that repeated transmission can be performed.

Information on a resource for transmission of the message requesting repeated transmission or the message indicating that repeated transmission can be performed (e.g., the message including a repeated transmission capability of the terminal) may be included in the repeated transmission configuration information. In this case, the terminal may transmit the message requesting repeated transmission or the message indicating that repeated transmission can be performed to the base station using the resource indicated by the repeated transmission configuration information. Information indicating enabling or disabling of the transmission operation of the message requesting repeated transmission or the message indicating that repeated transmission can be performed may be included in the repeated transmission configuration information. When the transmission operation of the message requesting repeated transmission or the message indicating that repeated transmission can be performed is enabled, and it is determined that repeated transmission is required, the terminal may transmit the message requesting repeated transmission or the message indicating that repeated transmission can be performed to the base station. When the transmission operation of the message requesting repeated transmission or the message indicating that repeated transmission can be performed is disabled, the terminal may not perform the transmission operation of the message.

The base station may receive the message from the terminal, and determine that repeated transmission is required based on the message. In this case, the base station may indicate the terminal to perform repeated transmission through dynamic signaling. The terminal may perform repeated transmission of the Msg4 HARQ-ACK or MsgB HARQ-ACK based on the dynamic signaling of the base station. For example, the base station may transmit to the terminal downlink control information (DCI) (e.g., PDCCH order, scheduling DCI for the Msg4, or scheduling DCI for the MsgB) indicating a value (e.g., repeated transmission number) of a specific information element among the information elements included in the repeated transmission configuration information configured by higher layer signaling. The terminal may perform repeated transmission of the Msg4 HARQ-ACK or MsgB HARQ-ACK based on the information indicated by the DCI received from the base station.

Hereinafter, specific exemplary embodiments of the repeated transmission method of an uplink signal/channel will be described with reference to FIG. 5.

[Method 1: Repeated Transmission Method of an Uplink Signal/Channel Based on Cell-Specific Configuration]

The repeated transmission configuration information may be cell-specific configuration information. In other words, the repeated transmission configuration information in the steps S510 and S520 of FIG. 5 may be cell-specific configuration information. All terminals belonging to the same cell may perform the same repeated transmission operation for an uplink signal/channel based on the cell-specific configuration information (e.g., repeated transmission configuration information). The same repeated transmission operation may mean that repeated transmission is performed with the same repeated transmission number (i.e., repetition factor) and/or that repeated transmission is performed with the same periodicity.

When Method 1 is performed, the repeated transmission operation may be simply performed, and signaling overhead for the repeated transmission operation may be small. Method 1 may be suitable when terminals belonging to the same cell have the same or similar channel conditions (e.g., received signal strengths, received signal power levels).

In the step S510 of FIG. 5, the base station may determine information element(s) required for all terminals belonging to the same cell to perform the same repeated transmission for an uplink signal/channel (e.g., Msg4 HARQ-ACK, MsgB HARQ-ACK), and generate repeated transmission configuration information including the determined information element(s). The repeated transmission configuration information may include at least one of an information element indicating enabling or disabling of repeated transmission, an information element indicating a target signal and/or target channel of repeated transmission, an information element (e.g., combination, list, or configuration) indicating a set of supportable repeated transmission numbers, an information element indicating a repeated transmission number, or an information element indicating a periodicity of repeated transmission.

In the step S520 of FIG. 5, the base station may transmit the repeated transmission configuration information, which is cell-specific configuration information, to the terminal through signaling. For example, the base station may broadcast system information (e.g., SIB1 and/or SIB19) including the repeated transmission configuration information. The system information may be transmitted on-demand. The terminal may receive the system information (e.g., SIB1 and/or SIB19) from the base station, and identify the repeated transmission configuration information included in the system information. The terminal may perform repeated transmission for an uplink signal/channel (e.g., Msg4 HARQ-ACK or MsgB HARQ-ACK) based on the repeated transmission configuration information. In the above-described exemplary embodiment, the repeated transmission configuration information may be included in an RRC message instead of the system information.

Alternatively, the base station may transmit DCI (e.g., DCI format 1_0) including the repeated transmission configuration information. The DCI may be DCI that schedules transmission of the Msg4 or MsgB. Alternatively, the DCI may be a PDDCH order that triggers the RA procedure. The repeated transmission configuration information included in the DCI may be applied to all terminals belonging to the same cell. The repeated transmission configuration information may be included in common DCI for all terminals belonging to the same cell. The DCI may include field(s) for indicating the repeated transmission configuration information. The existing field(s) included in the DCI may be reused to indicate the repeated transmission configuration information. In other words, the existing field(s) included in the DCI (e.g., downlink assignment index (DAI) field) may be interpreted as indicating the repeated transmission configuration information rather than the existing information. The terminal may receive the DCI from the base station and identify the repeated transmission configuration information included in the DCI. The terminal may perform repeated transmission for an uplink signal/channel (e.g., Msg4 HARQ-ACK or MsgB HARQ-ACK) based on the repeated transmission configuration information.

Meanwhile, in the step S510 of FIG. 5, the base station may determine whether to perform repeated transmission and/or a repeated transmission number. The base station may measure a reception quality of some or all of PRACH signals (e.g., Msg1, Msg3, MsgB) received from terminals within a cell (e.g., the same cell), and determine whether to perform repeated transmission and/or a repeated transmission number based on the measured reception quality. Alternatively, the base station may determine whether to perform repeated transmission and/or a repeated transmission number based on uplink and/or downlink channel quality information obtained from the terminals within the cell.

For example, when the reception quality (e.g., channel quality) is above a first threshold, the base station may determine that repeated transmission is not performed. In this case, the repeated transmission number may be determined to be 1. When the reception quality is equal to or below the first threshold, the base station may determine that repeated transmission is performed. In addition, when the reception quality is equal to or below the first threshold and above a second threshold, the base station may determine the repeated transmission number to be 2. The second threshold may be smaller than the first threshold. When the reception quality is equal to or below the second threshold, the base station may determine the repeated transmission number to be 4. The base station may signal to the terminal the repeated transmission configuration information including the determined information (e.g., an information element indicating enabling or disabling of repeated transmission, an information element indicating the repeated transmission number).

[Method 2: Repeated Transmission Method of an Uplink Signal/Channel Based on UE-Specific Configuration]

When Method 1 (e.g., repeated transmission method of an uplink signals/channel based on cell-specific configuration) is performed in a situation where channel statuses (e.g., received signal strengths, received signal power levels) of terminals belonging to the same cell are not the same or similar, a waste of resources may occur. To solve the above-described problem, repeated transmission of an uplink signal/channel may be performed based on UE-specific configuration.

In the step S510 of FIG. 5, the base station may determine, for each of the terminals, an information element indicating enabling or disabling of repeated transmission, an information element indicating a target signal and/or target channel of repeated transmission, an information element indicating a set of supportable repeated transmission numbers, an information element indicating a repeated transmission number, or an information element indicating a periodicity of repeated transmission, and generate repeated transmission configuration information including the determined information element(s).

In other words, the repeated transmission configuration information may be independently generated for each terminal. For example, repeated transmission configuration information for a first terminal may be different from repeated transmission configuration information for a second terminal. The base station may generate repeated transmission configuration information for the first terminal based on a channel quality (e.g., reception quality) between the first terminal and the base station. The base station may generate repeated transmission configuration information for the second terminal based on a channel quality (e.g., reception quality) between the second terminal and the base station.

In the step S520 of FIG. 5, the base station may signal the repeated transmission configuration information to each terminal. For example, the base station may transmit the repeated transmission configuration information to the first terminal through first signaling and transmit the repeated transmission configuration information to the second terminal through second signaling. The first signaling and second signaling may be performed independently. The first signaling and the second signaling may be UE-specific signaling.

In the step S530 of FIG. 5, the first terminal may perform repeated transmission based on the repeated transmission configuration information received from the base station, and the second terminal may perform repeated transmission based on the repeated transmission configuration information received from the base station. The repeated transmission of the first terminal and the repeated transmission of the second terminal may be performed independently.

The repeated transmission operation of a Msg4 HARQ-ACK (or MsgB HARQ-ACK) and signaling for the repeated transmission operation may be performed in the same or similar manner as the repeated transmission operation of a Msg3 and signaling for the repeated transmission operation. For example, the terminal may receive a synchronization signal block (SSB) from the base station, and determine whether repeated transmission is required based on a reception quality of the SSB. Alternatively, the terminal may determine whether repeated transmission is required based on a reception quality of other downlink signals/channels (e.g., reference signal, PDCCH, PDSCH, Msg2, Msg4, MsgB) instead of the SSB. When the reception quality of the SSB is equal to or below a SSB threshold, the terminal may perform a repeated transmission operation for an uplink signal/channel (e.g., Msg4 HARQ-ACK, MsgB HARQ-ACK). When the reception quality of the SSB exceeds the SSB threshold, the terminal may not perform a repeated transmission operation for an uplink signal/channel (e.g., Msg4 HARQ-ACK, MsgB HARQ-ACK). In this case, the terminal may transmit the uplink signal/channel (e.g., Msg4 HARQ-ACK, MsgB HARQ-ACK) once. To support the above-described operation, the repeated transmission configuration information in the steps S510 and S520 of FIG. 5 may include the SSB threshold. For example, the SSB threshold may be included in system information (e.g., SIB1 and/or SIB19). The terminal may determine whether to perform a repeated transmission operation for an uplink signal/channel (e.g., Msg4 HARQ-ACK, MsgB HARQ-ACK) based on the SSB threshold included in the repeated transmission configuration information received from the base station.

The terminal may measure a reception quality based on another reference signal (e.g., channel state information-reference signal (CSI-RS)) instead of the SSB. In this case, the terminal may compare the reception quality of the reference signal and the SSB threshold. In other words, although the SSB threshold is configured in the terminal to be compared with the reception quality of the SSB, if a reference signal (RS) threshold is not separately configured in the terminal, the terminal may compare the reception quality of the reference signal and the SSB threshold. Alternatively, when the base station configures a RS threshold to the terminal, the terminal may compare the reception quality of the reference signal and the RS threshold.

Meanwhile, the base station may configure repeated physical random access channel (PRACH) resources and non-repeated PRACH resources. The non-repeated PRACH resource may be the existing PRACH resource. The repeated PRACH resources may be configured independently from the non-repeated PRACH resources. Each of the repeated PRACH resources and the non-repeated PRACH resources may include a PRACH sequence (e.g., preamble sequence), RACH occasion (RO), and/or the like. The base station may transmit RACH configuration information to the terminal through a signal. The RACH configuration information may include configuration information of the non-repeated PRACH resources and/or configuration information of the repeated PRACH resources. When the repeated PRACH resources are not configured, the RACH configuration information may include configuration information of the non-repeated PRACH resources (e.g., the existing PRACH resources). When the repeated PRACH resources are configured, the RACH configuration information may include configuration information of the non-repeated PRACH resources and configuration information of the repeated PRACH resources.

The configuration information of the repeated PRACH resources or the configuration information of the repeated PRACH resources and configuration information of the non-repeated PRACH resources may be included in the repeated transmission configuration information in the steps S510 and S520 of FIG. 5. Alternatively, the base station may signal the configuration information of the repeated PRACH resources and/or the configuration information of the non-repeated PRACH resources to the terminal independently of the repeated transmission configuration information.

The terminal may receive the configuration information of the repeated PRACH resources and the configuration information of the non-repeated PRACH resources from the base station. Additionally, the terminal may receive a SSB (or other downlink signal/channel) from the base station, and determine whether repeated transmission is required based on a reception quality of the SSB. When the reception quality of the SSB is equal to or below the SSB threshold, the terminal may determine that a repeated transmission operation for an uplink signal/channel (e.g., Msg4 HARQ-ACK, MsgB HARQ-ACK) is required. In this case, the terminal may transmit a Msg1 or MsgA to the base station using a repeated PRACH resource. The Msg1 or MsgA transmitted using the repeated PRACH resource may indicate that repeated transmission of a Msg4 HARQ-ACK or MsgB HARQ-ACK is required.

When the reception quality of the SSB exceeds the SSB threshold, the terminal may determine that a repeated transmission operation for an uplink signal/channel (e.g., Msg4 HARQ-ACK, MsgB HARQ-ACK) is not required. In this case, the terminal may transmit a Msg1 or MsgA to the base station using a non-repeated PRACH resource. The Msg1 or MsgA transmitted using the non-repeated PRACH resource may indicate that repeated transmission of a Msg4 HARQ-ACK or MsgB HARQ-ACK is not required.

The base station may receive the Msg1 or MsgA from the terminal, identify the PRACH resource used for transmission of the Msg1 or MsgA. The base station may determine whether a repeated transmission operation of an uplink signal/channel (e.g., Msg4 HARQ-ACK, MsgB HARQ-ACK) is required at the terminal based on the identified PRACH resource. When it is identified that repeated transmission of an uplink signal/channel is required, the base station may determine repeated transmission configuration information based on a reception quality of the PRACH signal (e.g., Msg1, MsgB, and/or Msg3) received from the terminal. The base station may signal the repeated transmission configuration information to the terminal. The terminal may receive the repeated transmission configuration information from the base station and perform a repeated transmission operation for an uplink signal/channel (e.g., Msg4 HARQ-ACK, MsgB HARQ-ACK) based on the repeated transmission configuration information.

Meanwhile, the base station may inform the terminal of the repeated transmission configuration information using DCI (e.g., DCI format 1_0). The DCI used for transmission of the repeated transmission configuration information may be DCI associated with a Msg4 or MsgB. The DCI associated with the Msg4 or MsgB may be DCI that schedules transmission of the Msg4 or MsgB. For example, some bits of a modulation and coding scheme (MCS) field included in the DCI may be used to indicate a repeated transmission number. n least significant bits (LSBs) or n most significant bits (MSBs) of the MCS field may be used to indicate the repeated transmission number of the Msg4 or MsgB. n may be a natural number. As another example, some bits of a HARQ process number (HPN) field included in the DCI may be used to indicate the repeated transmission number. n LSBs or n MSBs of the HPN field may be used to indicate the repeated transmission number of the Msg4 or MsgB. n may be a natural number. As another example, all or part of a DAI field included in the DCI may be used to indicate the repeated transmission number. The terminal may receive the DCI from the base station, and identify the repeated transmission number based on some bits of the MCS field, HPN field, or DAI field included in the DCI. The repeated transmission number may also be indicated by other field(s) included in the DCI. In the present disclosure, 'some bits' may mean n LSBs or n MSBs.

Before indicating the repeated transmission number using the DCI, the base station may transmit system information, RRC message, and/or MAC CE including an information element indicating a set (e.g., combination, list, configuration) of supportable repeated transmission numbers to the terminal. The terminal may identify the set (e.g., combination, list, configuration) of supportable repeated transmission numbers based on the system information, RRC message, and/or MAC CE received from the base station. For example, the base station may configure the set of supportable repeated transmission numbers to the terminal as {1,2,4,8}, and may indicate one value (e.g., repeated transmission number) among {1,2,4,8} using DCI (e.g., some bits of the MCS field, some bits of the HPN field, and some fields of the DAI field). Alternatively, the set of supportable repeated transmission numbers may be predefined in the technical specifications. The set of supportable repeat transmission numbers may be configured in various manners other than {1,2,4,8}.

When some bits of the MCS field, HPN field, or DAI field are set to '00', those bits may indicate that the repeated transmission number is 1. When some bits of the MCS field, HPN field, or DAI field are set to '01', those bits may indicate that the repeated transmission number is 2. When some bits of the MCS field, HPN field, or DAI field are set to '10', those bits may indicate that the repeated transmission number is 4. When some bits of the MCS field, HPN field, or DAI field are set to '11', those bits may indicate that the repeated transmission number is 8. The terminal may receive the DCI from the base station and identify the repeated transmission number based on some bits of the MCS field, HPN field, or DAI field included in the DCI. The repeated transmission number may also be indicated by other field(s) included in the DCI.

Alternatively, a set (e.g., combination, list, configuration) of supportable repeat transmission numbers may not be configured in the terminal. In this case, the base station may indicate the repeated transmission number using DCI (e.g., some bits of the MCS field, some bits of the HPN field, and some bits of the DAI field). A value obtained by adding 1 to a value of some bits of the MCS field, HPN field, or DAI field may indicate the repeated transmission number. The terminal may receive the DCI from the base station, identify the value of some bits of the MCS field, HPN field, or DAI field included in the DCI, and interpret a value obtained by adding 1 to the value of some bits as the repeated transmission number. The terminal may repeatedly transmit an uplink signal/channel (e.g., Msg4 HARQ-ACK, MsgB HARQ-ACK) as many times as the repeated transmission number.

Alternatively, some bits of the MCS field and some bits of the HPN field may be used together to indicate the repeated transmission number. Alternatively, some bits of the MCS field included in the DCI may be used to indicate a set of supportable repeat transmission numbers, and some bits of the HPN field included in the DCI may be used to indicate one value (e.g., repeated transmission number) of the set. Alternatively, some bits of the HPN field included in the DCI may be used to indicate a set of supportable repeated transmission numbers, and some bits of the MCS field included in the DCI may be used to indicate one value (e.g., repeated transmission number) of the sets.

The sets of supportable repeat transmission numbers may be configured as {1,2,3,4}, {1,2,4,8}, {2,4,6,8}, and {2,4, 8,16}. The sets of supportable repeated transmission numbers may be predefined in technical specifications. Alternatively, the sets of supportable repeated transmission numbers may be configured by SI signaling and/or RRC signaling. As shown in Table 4 below, some bits of the MCS field or HPN field may indicate one combination of the sets of supportable repeated transmission numbers. The some bits may be n LSBs or n MSBs.

TABLE 4

| Some bits of MCS field (or HPN field) | Sets of supportable repeated transmission numbers |
|---|---|
| 00 | {1, 2, 3, 4} |
| 01 | {1, 2, 4, 8} |
| 10 | {2, 4, 6, 8} |
| 11 | {2, 4, 8, 16} |

When some bits (e.g., '01') of the MCS field specified in Table 4 indicate a set of supportable repeated transmission numbers (e.g., {1,2,4,8}), some bits of the HPN field may indicate one element (e.g., repeated transmission number) in the set, as shown in Table 5 below. When some bits (e.g., '01') of the HPN field specified in Table 4 indicate a set of supportable repeat transmission numbers (e.g., {1,2,4,8}), some bits of the MCS field may indicate one element (e.g., repeated transmission number) in the set, as shown in Table 5 below.

TABLE 5

| Some bits of HPN field (or MCS field) | When a set of supportable repeated transmission numbers is indicated as {1, 2, 4, 8} |
|---|---|
| 00 | First element in the set (e.g., repeated transmission number = 1) |
| 01 | Second element in the set (e.g., repeated transmission number = 2) |
| 10 | Third element in the set (e.g., repeated transmission number = 4) |
| 11 | Fourth element in the set (e.g., repeated transmission number = 8) |

[Method 3: Repeated Transmission Method of an Uplink Signal/Channel Based on Hybrid Scheme]

In a hybrid scheme, cell-specific configuration and UE-specific configuration may be used together. For example, based on Method 1, repeated transmission configuration information, which is cell-specific configuration information, may be configured in the terminal, and based on Method 2, repeated transmission configuration information, which is UE-specific configuration information, may be configured in the terminal.

The base station may configure a PRACH resource for each repeated transmission number of a Msg4 HARQ-ACK or MsgB HARQ-ACK, and transmit configuration information of the PRACH resource to the terminal. In this case, a plurality of PRACH resources may be configured. For example, the base station may configure a first PRACH resource for one-time transmission of a Msg4 HARQ-ACK or MsgB HARQ-ACK, a second PRACH resource for two repeated transmissions of a Msg4 HARQ-ACK or MsgB HARQ-ACK, a third PRACH resource for four repeated transmissions of a Msg4 HARQ-ACK or MsgB HARQ-ACK, and a fourth PRACH resource for eight repeated transmissions of a Msg4 HARQ-ACK or MsgB HARQ-ACK.

The terminal may receive configuration information for the respective PRACH resources from the base station. The terminal may receive a SSB from the base station, select one PRACH resource among the PRACH resources configured by the base station based on a result of comparison between a reception quality of the SSB and a SSB threshold, and transmit a Msg1 or MsgA to the base station using the selected PRACH resource. The base station may receive the Msg1 or MsgA from the terminal, identify the PRACH resource used for transmission of the Msg1 or MsgA, and identify a repeated transmission number corresponding to the identified PRACH resource. The base station may expect a Msg4 HARQ-ACK or MsgB HARQ-ACK to be transmitted repeatedly as many times as the identified repeated transmission number. The terminal identify the repeated transmission number corresponding to the selected PRACH resource, and may confirm a repeated transmission operation for the Msg4 HARQ-ACK or MsgB HARQ-ACK according to the identified repeated transmission number.

To support the above-described operation, the base station may configure a plurality of SSB thresholds and transmit configuration information of the plurality of SSB thresholds to the terminal. The terminal may receive the configuration information of the plurality of SSB thresholds from the base station. The plurality of SSB thresholds may be included in the repeated transmission configuration information in the steps S510 and S520 of FIG. 5. Alternatively, the configuration information of the plurality of SSB thresholds may be signaled to the terminal independently of the repeated transmission configuration information.

Four PRACH resources may be configured in the terminal for the repeated transmission for the Msg4 HARQ-ACK or MsgB HARQ-ACK, and three SSB thresholds may be configured in the terminal to select one PRACH resource among the four PRACH resources. The four PRACH resources may correspond to different repeated transmission numbers, respectively. The three SSB thresholds may be th1, th2, and th3. The sizes of the three SSB thresholds may be defined as th1>th2>th3. As described above, by configuring four PRACH resources and three SSB thresholds, terminals belonging to the cell of the base station may be classified into four groups. In other words, the base station may configure four PRACH resources and three SSB thresholds to the terminals in order to classify the terminals belonging to the same cell into four groups. According to Table 6 below, the terminal may select one PRACH resource among the four PRACH resources based on a comparison result between the reception quality of the SSB and the SSB thresholds (i.e., th1, th2, th3), and use the selected PRACH resource to transmit the Msg1 or MsgA to the base station.

TABLE 6

| Set of supportable repeated transmission numbers {1, 2, 4, 8} | Reception quality of SSB | PRACH resource |
|---|---|---|
| First element in the set (e.g., repeated transmission number = 1) | reception quality of SSB > th1 | first PRACH resource (00) |
| Second element in the set (e.g., repeated transmission number = 2) | th1 ≥ reception quality of SSB > th2 | second PRACH resource (01) |
| Third element in the set (e.g., repeated transmission number = 4) | th2 ≥ reception quality of SSB > th3 | third PRACH resource (10) |
| Fourth element in the set (e.g., repeated transmission number = 8) | th3 ≥ reception quality of SSB | fourth PRACH resource (11) |

In the operations according to Table 6, the terminal may measure a reception quality of a reference signal (e.g., CSI-RS) instead of SSB, compare a reception quality of the reference signal to a threshold (e.g., SSB threshold or RS threshold), select one PRACH resource among the four PRACH resources based on a result of the comparison, and transmit a Msg1 or MsgA to the base station using the selected PRACH resource.

The base station may receive the Msg1 or MsgA from the terminal, identify the PRACH resource used for transmission of the Msg1 or MsgA, and identify the reception quality of the SSB measured at the terminal based on the identified PRACH resource. In other words, the base station may identify channel state information measured at the terminal based on the PRACH resource used for transmission of the Msg1 or MsgA of the terminal. The base station may determine a repeated transmission number for a Msg4 HARQ-ACK or MsgB HARQ-ACK based on the channel state information measured at the terminal, measurement information of the Msg1, measurement information of the Msg3, and/or measurement information of the MsgA. Based on Method 2, the base station may inform the terminal of the repeated transmission number for the Msg4 HARQ-ACK or MsgB HARQ-ACK. The terminal may receive information on the repeated transmission number for the Msg4 HARQ-ACK or MsgB HARQ-ACK from the base station, and may repeatedly transmit the Msg4 HARQ-ACK or MsgB HARQ-ACK as many times as the repeated transmission number.

[Method 4: Determination and Signaling Method of Configuration (e.g., Cell-Specific Configuration or UE-Specific Configuration) Used for Repeated Transmission of an Uplink Signal/Channel]

The base station may determine whether repeated transmission of an uplink signal/channel (e.g., Msg4 HARQ-ACK or MsgB HARQ-ACK) is performed based on cell-specific configuration or UE-specific configuration, and signal the determined information (e.g., configuration used for repeated transmission of the uplink signal/channel) to the terminal. For example, the base station may transmit an SI message (or other signaling message) including information indicating whether repeated transmission of the uplink signal/channel is performed based on cell-specific configuration or UE-specific configuration. When channel information (e.g., channel quality information) for uplink of terminal(s) within a coverage of the base station is uncertain or when channel information (e.g., channel quality information) for uplink of terminal(s) within a coverage of the base station is not sufficient, the base station may determine that repeated transmission of an uplink signal/channel is performed based on cell-specific configuration, and transmit an SI message (or other signaling message) indicating that repeated transmission of an uplink signal/channel is performed based on cell-specific configuration. In other words, the base station may indicate terminals belonging to the same cell to perform the same repeated transmission operation (e.g., common repeated transmission operation) for the uplink signal/channel.

The terminal may identify whether repeated transmission of the uplink signal/channel is performed based on cell-specific configuration or UE-specific configuration based on the information included in the SI message (or other signaling message) received from the base station. When it is identified that repeated transmission of the uplink signal/channel is performed based on cell-specific configuration, the terminal may perform repeated transmission of the uplink signal/channel based on repeated transmission configuration information configured as cell-specific configuration information. When it is identified that repeated transmission of the uplink signal/channel is performed based on UE-specific configuration, the terminal may perform repeated transmission of the uplink signal/channel based on repeated transmission configuration information configured as UE-specific configuration information.

Meanwhile, the terminal(s) may report channel quality information (e.g., channel state information) to the base station periodically or aperiodically. When sufficient channel quality information is obtained from the terminal(s), the base station may determine repeated transmission configuration information, which is UE-specific configuration information, based on the channel quality information. For example, the base station may determine a repeated transmission number for each terminal based on the channel quality information. The base station may transmit an SI message (or other signaling message) including the repeated transmission configuration information, which is UE-specific configuration information, to each of the terminals. In this case, repeated transmission of the uplink signal/channel may be performed based on the UE-specific configuration information instead of cell-specific configuration information.

Alternatively, when channel information (e.g., channel quality information) for uplink of terminal(s) within a coverage of the base station is uncertain or when channel information (e.g., channel quality information) for uplink of terminal(s) within a coverage of the base station is not sufficient, the base station may determine that repeated transmission of the uplink signal/channel is performed based on UE-specific configuration, and may transmit an SI message (or other signaling message) including information indicating that repeated transmission of an uplink signal/channel is performed based on UE-specific configuration. In this case, different repeated transmission numbers may be indicated to the respective terminals. The terminal may perform repeated transmission of the uplink signal/channel based on UE-specific repeated transmission configuration information.

Meanwhile, the terminal(s) may report channel quality information (e.g., channel state information) to the base station periodically or aperiodically. If sufficient channel quality information is obtained from the terminal(s), the base station may determine repeated transmission configuration information, which is cell-specific configuration information, based on the channel quality information. For example, the base station may determine a repeated transmission number, which is common information for terminals belonging to the same cell, based on the channel quality information. The base station may transmit an SI message (or other signaling message) including repeated transmission configuration information, which is cell-specific configuration information, to each of the terminals. In this case, repeated transmission of the uplink signal/channel may be performed based on the cell-specific configuration information instead of UE-specific configuration information.

The signaling messages to support the above-described operations may be defined as follows. The base station may generate a signaling message (e.g., SI message (e.g., SIB1 or SIB19), RRC message) including NTN_cellSpecific_MSG4_HARQconfig (or NTN_cellSpecific_MSGB_HARQconfig, TN_cellSpecific_MSG4_HARQconfig, TN_cellSpecific_MSGB_HARQconfig), and transmit the signaling message to the terminal(s). When NTN_cellSpecific_MSG4_HARQconfig (or NTN_cellSpecific_MSGB_HARQconfig, TN_cellSpecific_MSG4_HARQconfig, TN_cellSpecific_MSGB_HARQconfig) is set to a first value (e.g., 0), repeated transmission of the uplink signal/channel may be performed based on UE-specific configuration information. When NTN_cellSpecific_MSG4_HARQconfig (or NTN_cellSpecific_MSGB_HARQconfig, TN_cellSpecific_MSG4_HARQconfig, TN_cellSpecific_MSGB_HARQconfig) is set to a second value (e.g., 1), repeated transmission of the uplink signal/channel may be performed based on cell-specific configuration information.

When NTN_cellSpecific_MSG4_HARQconfig (or, NTN_ cellSpecific_MSGB_HARQconfig, TN_cellSpecific_ MSG4_ HARQconfig, TN_cellSpecific_MSGB_HARQconfig) is set to the second value (e.g., 1), the base station may configure NTN_cellSpecific_MSG4_HARQ_NUM (or, NTN_cellSpecific_MSGB_HAR, TN_cellSpecific_MSG4_HARQ_NUM, TN_cellSpecific_MSGB_HARQ_NUM) indicating a repeated transmission number, and transmit a signaling message including NTN_cellSpecific_MSG4_HARQ_NUM (or, NTN_cellSpecific_MSGB_HAR, TN_cellSpecific_MSG4_ HARQ_NUM, TN_cellSpecific_MSGB_HARQ_NUM) to the terminal.

The size of NTN_cellSpecific_MSG4_HARQ_NUM (or, NTN_cellSpecific_MSGB_HAR, TN_cellSpecific_MSG4_HARQ_NUM, TN_cellSpecific_MSGB_HARQ_NUM) may be 3 bits, in which case NTN_cellSpecific_MSG4_HARQ_NUM (or, NTN_cellSpecific_MSGB_HAR, TN_cellSpecific_MSG4_HARQ_NUM, TN_cellSpecific_MSGB_HARQ_NUM) may indicate a value between 1 and 8 as the repeated transmission number. The terminal may receive the signaling message from the base station and identify NTN_cellSpecific_MSG4_HARQ_NUM (or, NTN_cellSpecific_MSGB_HAR, TN_cellSpecific_MSG4_HARQ_NUM, TN_cellSpecific_MSGB_HARQ_NUM) included in the signaling message. When NTN_cellSpecific_MSG4_HARQ_NUM (or, NTN_cellSpecific_MSGB_HAR, TN_cellSpecific_MSG4_HARQ_NUM, TN_cellSpecific_MSGB_HARQ_NUM) is configured by the signaling message, the terminal may determine that repeated transmission of the uplink signal/channel is requested. The terminal may identify the repeated transmission number indicated by NTN_cellSpecific_MSG4_HARQ_NUM (or, NTN_cellSpecific_MSGB_HAR, TN_cellSpecific_MSG4_ HARQ_NUM, TN_cellSpecific_MSGB_HARQ_NUM). The terminal may perform repeated transmission of the uplink signal/channel (e.g., Msg4 HARQ-ACK or MsgB HARQ-ACK) as many times as the identified repeated transmission number.

[Method 5: Delivery Method of a Protocol and/or Signaling Scheme for Repeated Transmission of Uplink Signal/Channel]

The base station may deliver a protocol and/or signaling scheme for repeated transmission of uplink signal/channel (e.g., Msg4 HARQ-ACK or MsgB HARQ-ACK) to the terminal. The protocols and/or signaling schemes for repeated transmission of uplink signal/channel may be predefined in the technical specifications, and the base station may transmit to the terminal a signaling message (e.g., SIB1, SIB19, RRC messages) including information indicating a protocol and/or signaling scheme to be used at a specific time. The terminal may receive the signaling message from the base station, identify the protocol and/or signaling scheme indicated by the information included in the signaling message, and perform repeated transmission of uplink signal/channel based on the identified protocol and/or signaling scheme.

The above-described exemplary embodiments of the present disclosure may be applied to repeated transmission of a Msg4 HARQ-ACK or MsgB HARQ-ACK as well as other uplink signals/channels and/or downlink signals/channels.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:

receiving, from a base station, repeated transmission configuration information of repeated transmission for a message 4 (Msg4) hybrid automatic repeat request-acknowledgement (HARQ-ACK), the repeated transmission configuration information including an information element indicating a quality threshold used to determine whether to perform repeated transmission;

measuring a reception quality for a downlink signal/channel received from the base station;

receiving a Msg4 from the base station in a random access (RA) procedure between the terminal and the base station; and performing repeated transmission for the Msg4 HARQ-ACK based on the repeated transmission configuration information in response to determining that the reception quality is below the quality threshold.

2. The method according to claim 1, wherein the repeated transmission configuration information further includes at least one of: an information element indicating enabling or disabling of repeated transmission, an information element indicating a target signal of repeated transmission, an information element indicating a target channel of repeated transmission, an information element indicating a set of supportable repeated transmission numbers, an information element indicating a repeated transmission number, an information element indicating a periodicity of repeated transmission, an information element indicating a transmission resource of a message requesting repeated transmission, an information element indicating enabling or disabling a transmission operation of the message requesting repeated transmission, an information element indicating a transmission resource of a message indicating that repeated transmission can be performed, or an information element indicating enabling or disabling a transmission operation of the message indicating that repeated transmission can be performed.

3. The method according to claim 1, wherein the repeated transmission configuration information is received through at least one of a system information block (SIB) or downlink control information (DCI), and the DCI is a scheduling DCI for the Msg4.

4. The method according to claim 1, wherein the receiving of the repeated transmission configuration information comprises:

receiving, from the base station, a SIB including an information element indicating a set of supportable repeated transmission numbers; and receiving, from the base station, a DCI including an information element indicating one repeated transmission number among the supportable repeated transmission numbers.

5. The method according to claim 4, wherein the information element indicating the one repeated transmission number is expressed by a modulation and coding scheme (MCS) field, a HARQ process number (HPN) field, or a downlink assignment index (DAI) field included in the DCI.

6. The method according to claim 1, wherein the quality threshold used to determine whether to perform the repeated transmission for the Msg4 HARQ-ACK is distinct from a quality threshold used to determine whether to perform repeated transmission for a message 3 (Msg3).

7. A method of a base station, comprising:

transmitting, to a terminal, repeated transmission configuration information of repeated transmission of a message4 (Msg4) hybrid automatic repeat request-acknowledgement (HARQ-ACK), the repeated transmission configuration information including an information element indicating a quality threshold used to determine whether to perform repeated transmission;

transmitting a Msg4 to the terminal in a random access (RA) procedure between the base station and the terminal; and performing a reception operation for the Msg4 HARQ-ACK based on the repeated transmission configuration information, wherein the Msg4 HARQ-ACK is repeatedly transmitted from the terminal in response to determining that a reception quality for a downlink signal/channel received by the terminal is below the quality threshold.

8. The method according to claim 7, wherein the repeated transmission configuration information further includes at least one of: an information element indicating enabling or disabling of repeated transmission, an information element indicating a target signal of repeated transmission, an information element indicating a target channel of repeated transmission, an information element indicating a set of supportable repeated transmission numbers, an information element indicating a repeated transmission number, an information element indicating a periodicity of repeated transmission, an information element indicating a transmission resource of a message requesting repeated transmission, an information element indicating enabling or disabling a transmission operation of the message requesting repeated transmission, an information element indicating a transmission resource of a message indicating that repeated transmission can be performed, or an information element indicating enabling or disabling a transmission operation of the message indicating that repeated transmission can be performed.

9. The method according to claim 7, wherein the repeated transmission configuration information is transmitted through at least one of a system information block (SIB) or downlink control information (DCI), and the DCI is a scheduling DCI for the Msg4.

10. The method according to claim 7, wherein the transmitting of the repeated transmission configuration information comprises:

transmitting, to the terminal, a SIB including an information element indicating a set of supportable repeated transmission numbers; and transmitting, to the terminal, a DCI including an information element indicating one repeated transmission number among the supportable repeated transmission numbers.

11. The method according to claim 10, wherein the information element indicating the one repeated transmission number is expressed by a modulation and coding scheme (MCS) field, a HARQ process number (HPN) field, or a downlink assignment index (DAI) field included in the DCI.

12. A terminal comprising at least one processor, wherein the at least one processor causes the terminal to perform:

receiving, from a base station, repeated transmission configuration information of repeated transmission for a message 4 (Msg4) hybrid automatic repeat request-acknowledgement (HARQ-ACK), the repeated transmission configuration information including an information element indicating a quality threshold used to determine whether to perform repeated transmission;

measuring a reception quality for a downlink signal/channel received from the base station;

receiving a Msg4 from the base station in a random access (RA) procedure between the terminal and the base station; and performing repeated transmission for the Msg4 HARQ-ACK based on the repeated transmission configuration information in response to determining that the reception quality is below the quality threshold.

13. The terminal according to claim 12, wherein the repeated transmission configuration information further includes at least one of: an information element indicating enabling or disabling of repeated transmission, an information element indicating a target signal of repeated transmission, an information element indicating a target channel of repeated transmission, an information element indicating a set of supportable repeated transmission numbers, an information element indicating a repeated transmission number, an information element indicating a periodicity of repeated transmission, an information element indicating a transmission resource of a message requesting repeated transmission, an information element indicating enabling or disabling a transmission operation of the message requesting repeated transmission, an information element indicating a transmission resource of a message indicating that repeated transmission can be performed, or an information element indicating enabling or disabling a transmission operation of the message indicating that repeated transmission can be performed.

14. The terminal according to claim 12, wherein the repeated transmission configuration information is received through at least one of a system information block (SIB) or downlink control information (DCI), and the DCI is a scheduling DCI for the Msg4.

15. The terminal according to claim 12, wherein in the receiving of the repeated transmission configuration information, the at least one processor further causes the terminal to perform:

receiving, from the base station, a SIB including an information element indicating a set of supportable repeated transmission numbers; and receiving, from the base station, a DCI including an information element indicating one repeated transmission number among the supportable repeated transmission numbers.

16. The terminal according to claim 15, wherein the information element indicating the one repeated transmission number is expressed by a modulation and coding scheme (MCS) field, a HARQ process number (HPN) field, or a downlink assignment index (DAI) field included in the DCI.

* * * * *